REED RELAY SHIFT REGISTER AND COUNTER CIRCUITS

Filed Aug. 10, 1965 4 Sheets-Sheet 1

INVENTORS T. N. LOWRY
J. E. SMATHERS

BY

Charles Scott Phelan

ATTORNEY

REED RELAY SHIFT REGISTER AND COUNTER CIRCUITS

Filed Aug. 10, 1965 4 Sheets-Sheet 2

REED RELAY SHIFT REGISTER AND COUNTER CIRCUITS

Filed Aug. 10, 1965 4 Sheets-Sheet 3

3,456,241
REED RELAY SHIFT REGISTER AND COUNTER CIRCUITS

Terrell N. Lowry, Columbus, Ohio, and John E. Smathers, Hillsboro, Oreg., assignors to Bell Telephone Laboratories, Incorporated, New York, N.Y., a corporation of New York Filed Aug. 10, 1965, Ser. No. 478,538
Int. Cl. H03k *23/03;* G11c *11/52, 19/00*
U.S. Cl. 340—168 10 Claims

ABSTRACT OF THE DISCLOSURE

Reed relay register and ring counter circuits are developed by using multiphase cyclical clock signals for controlling all operate, latch, and release functions of the relays. The relays have only make contacts. Relay contact erosion is reduced by operating the relays without opening and closing contacts with power applied thereacross.

This invention relates to a chain stepping circuit more particularly described as a relay switching circuit.

A shift register is a chain stepping circuit comprised of a series of stages that store information for brief intervals. A shift register stage includes memory elements, delay elements, and control circuitry. Information stored in memory elements of such stages periodically is shifted from each of such memory elements through a delay element to a memory element in a succeeding stage. Information shifts from stage to stage are initiated by shift signals from a control source.

In prior art relay shift register circuits, memory elements are nonself-latching relays having break contacts to perform certain of their logical functions. Register control circuitry comprises a clock source, a latching source, and stage connecting circuitry. Operate, latch, and release functions of relays are assigned to the control circuitry. Of these functions, operation and release of relays are provided as a result of a clock source and stage connecting circuitry. Latching is provided by a latching source and stage connecting circuitry. Because the clock source and the latching source are both used for energizing circuit relays, these circuits require two separate items of equipment for the energization of the relays.

Although prior art circuits perform satisfactorily, they are not necessarily suitable for installations where a large number of register stages are controlled by one clock source. Where many shift register stages are operated by one clock source, a simplification in stage circuitry can provide a cost reduction that is multiplied by the number of stages so simplified.

It is an object of this invention to simplify relay shift register stage circuitry.

It is another object of this invention to extend latching type of memory to a chain of nonself-latching elements.

It is another object of this invention to exclusively energize and control the operate, latch, and release functions of switching elements by clock phases.

It is a further object of this invention to provide relay shift register stage circuitry employing make contacts exclusively.

These and other objects of the invention are realized in an illustrative embodiment thereof which is a reed relay shift register. A multiphase cyclical clock operates, latches, and releases register relays. The clock circuit combines time sequence control and external latching into one circuit unit for a nonself-latching type of memory. A result of combining these functions is a clock control source having separate phase signals which control time-sequencing of nonself-latching relays without an external constant power source for latching. Each register stage comprises a reed relay memory element, a reed relay delay element, and control circuitry interposed between relay windings and energizing clock phase signals.

There are species of the invention in which relays are energized, latched, and released without opening or closing contacts while power is applied thereacross. Hereinafter, the opening or closing of contacts while source power is absent from them is called "dry" operation.

A feature of the invention is that the operate, latch, and release functions of a relay switching circuit are controlled by cyclically repetitive output signals from a plural-output source.

Another feature is that the control function and the latching functions of a relay shift register are combined into one clock control source and associated control circuitry.

Another feature is that a relay switching circuit is controlled for dry contact operation, which reduces arcing and contact erosion, and thereby insures long reliable contact life.

An additional feature is a simplified relay shift register stage in which relay operate, latch, and release functions are controlled by means of cyclically recurring energization signals from a source having plural separate outputs.

A further feature is a clock control source energizing and controlling relay elements of a plurality of simplified relay shift register stages without a separate latching energy source for relay circuit elements.

A still further feature is a relay shift register stage in which relay operate, latch, and release functions are performed through combinations of relay contacts which employ exclusively contacts of a make type.

A better understanding of the invention may be derived from a detailed description following when that description is considered together with the attached drawings, in which.

Figure 1:
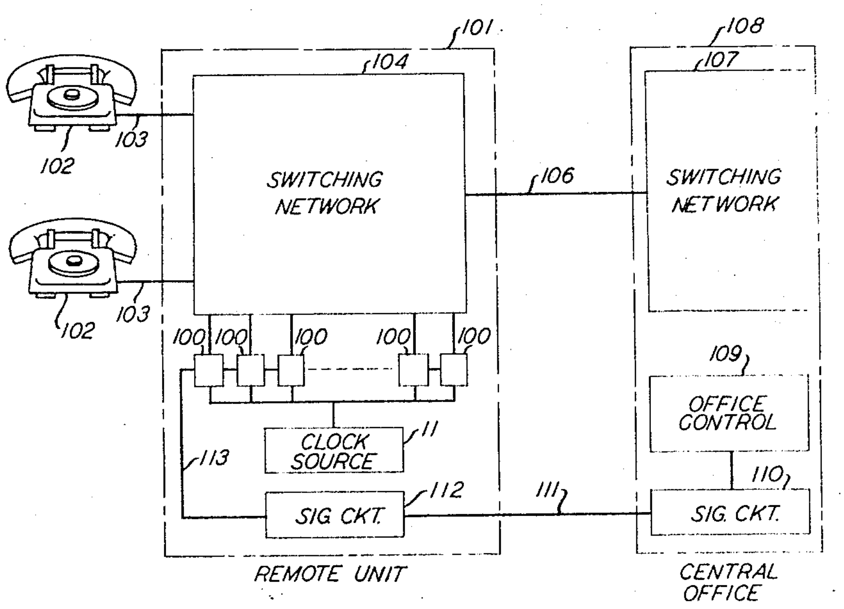
FIG. 1 is a block diagram of part of a telephone remote line concentrator utilizing a plurality of shift register stages controlled by one clock source.

Referring now to FIG. 1, a clock source 11 is connected in a multiple arrangement to a plurality of shift register stages 100 in a remote unit 101 of a telephone line concentrator. A plurality of telephone subscriber sets 102 are connected by a plurality of cable pairs 103 to a remote switching network 104. By means of the remote switching network 104 a particular one of the cable pairs 103 is connected to a second cable pair 106, thus providing the subscriber set 102, associated with the particular cable pair 103, with access to a switching network 107 in a central office 108. The shift register stages 100 are employed to direct the operation of the switching network 104 in the remote unit 101. For control of a particular operation of the switching network 104, an office control 109, located in the central office 108, determines a group of control signals which are applied to the network 104. An example of such a group of signals is a network instruction in binary coded form. The office control 109 transmits the network instruction in a serial binary coded form through a first signaling circuit 110 and a third cable pair 111 to a second signaling circuit 112. The group of signals in the network instruction is a series of pulses which successively arrive at the signaling circuit 112 where they produce input signals which are applied through a lead 113 to a first one of the shift register stages 100. The clock source 11 energizes all of the stages 100 of the shift register simultaneously, with alternate operate and latch signals, so as to shift the pulses, received at the first one of the stages, through each successive one of the register stage. When a complete network instruction has been shifted into a proper group of shift register stages 100, the desired operation of the switching network 104 is performed.

Figure 2:
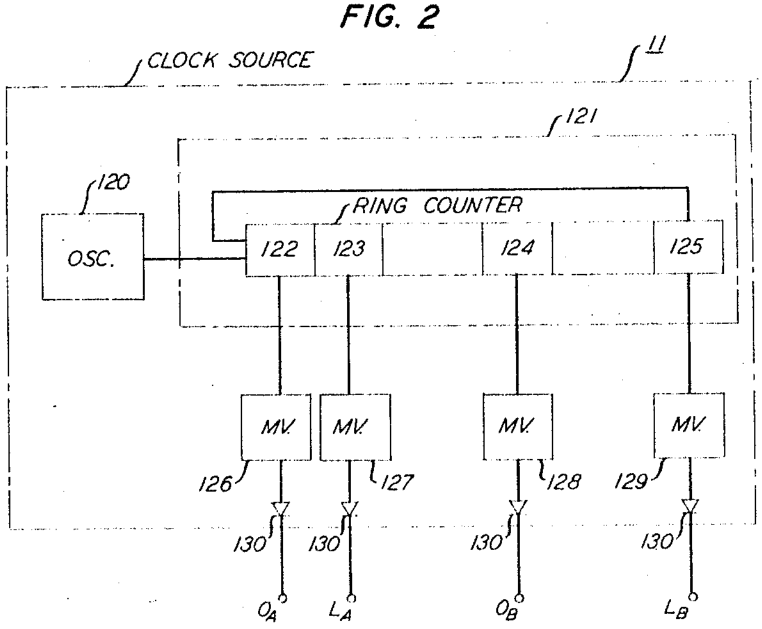
FIG. 2 is a block diagram of a suitable clock source having plural outputs producing cyclically repetitive signals.

Referring to FIG. 2, there is shown one known type of clock arrangement that is useful for the clock source 11. A free running oscillator 120 is connected to the input of a ring counter 121. The ring counter 121 includes several stages such as 122, 123, 124, and 125 which produce useful output signals. The outputs of these stages are connected, respectively, to monostable multivibrators 126, 127, 128 and 129, each of which has an output circuit incorporating a diode 130 that is applied in a manner to be described hereinafter. One bit of information in the ring counter 121 is shifted in response to signals from the oscillator 120.

Figure 7A:
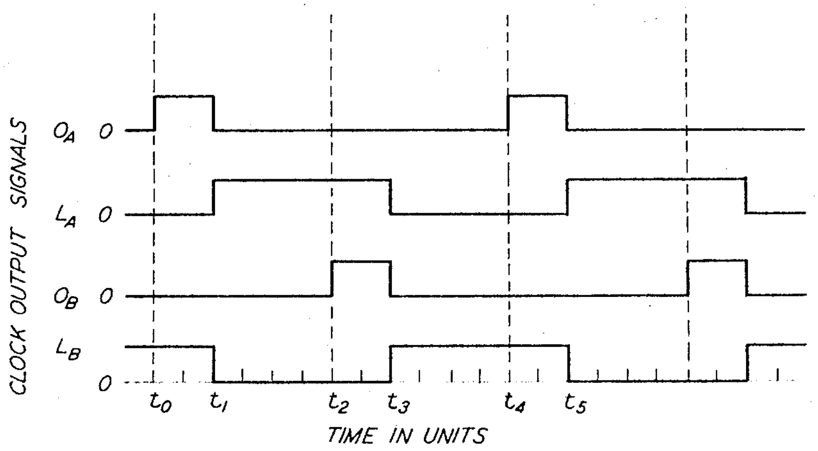
FIGS. 7A and 7B show diagrams of cyclically repetitive clock output signals for four-phase and two-phase circuit operation.
Figure 7B:
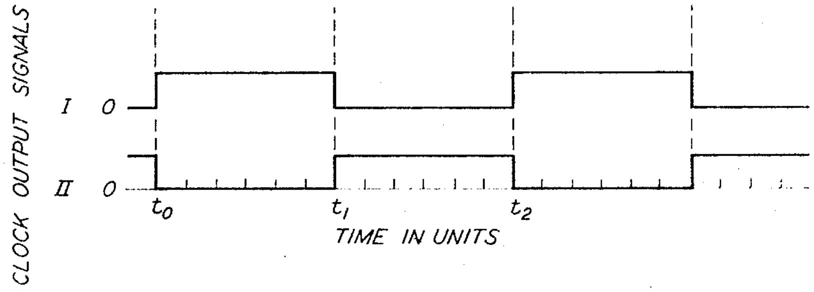

When this one bit is shifted into the counter stage 122, the bit triggers the monostable multivibrator circuit 126. In sequence each multivibrator is similarly triggered during every cycle of the ring counter. Since the one bit of information in the ring counter is shifted one stage along the ring counter for each oscillator cycle, these oscillator cycles are used to represent time points on a signal versus time plot such as shown in FIG. 7A. In FIG. 7A a ring counter cycle and a clock cycle have concurrent time durations. Time constants of the multivibrator circuits are adjusted to produce a time sequence of signals at output terminals $O_A$, $L_A$, $O_B$ and $L_B$ similar to the signals shown in FIG. 7A. FIG. 7B shows another time sequence of signals of a similar clock configuration having only two output signals.

Figures 3, 3A, 4:
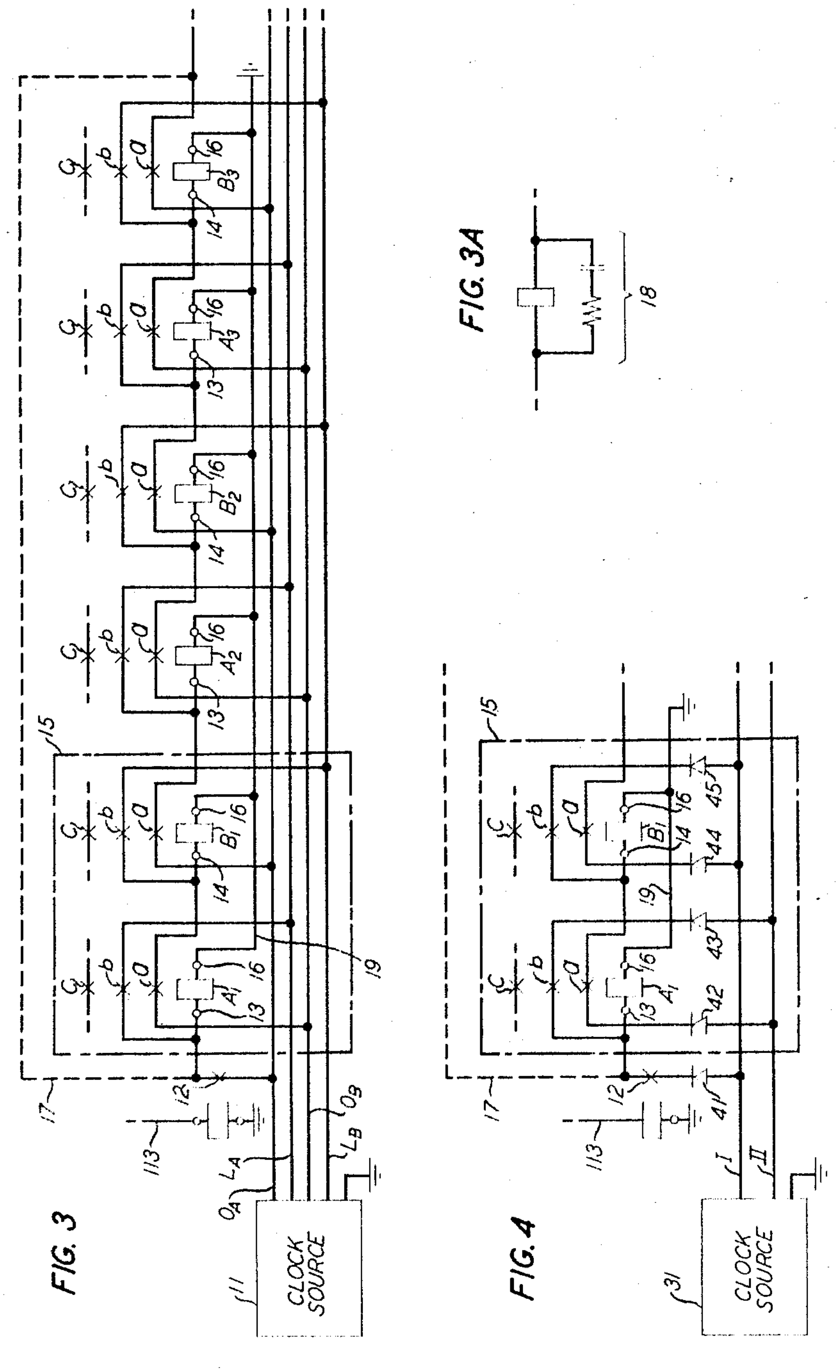
FIGS. 3 and 3A are schematic diagrams of a basic four-phase relay shift register circuit using single-winding relays.
FIG. 4 is a schematic diagram for one stage of a two-phase relay shift register using single-winding relays and using diodes in relay energization leads.

In FIG. 3 there is shown a first embodiment of the invention in which the source 11 has four signal outputs, which are connected respectively to four similarly designated signal buses. These signal buses extend from the clock source to all stages of a relay shift register. Reference characters in FIG. 3 are the same as those in FIGS. 1 and 2 for corresponding circuit elements. A first register stage 15 comprises a relay $A_1$, a relay $B_1$, and associated control circuitry interconnecting the stage with signal buses $O_A$, $L_A$, $O_B$, $L_B$, input switch or relay contact 12, and a second register stage. The time sequence of output signals from clock source 11 to this shift register is shown in FIG. 7A where a clock cycle commences at time $t_0$ and ends at time $t_4$. There are three requirements, subsequently to be discussed more fully, which are limits to the sequence of clock source signals. The first requirement is that the duration of operate signals, such as $O_A$ and $O_B$, must be equal to or greater than the maximum relay operate time. A second requirement is that a sufficient interval for the slowest relay to release must be provided after the termination of each signal in one cycle and prior to the initiation of that signal, in the next following cycle. The third requirement is that the ratio of operate signal duration to minimum relay operate time must be less than three.

A subscript number in each relay designation identifies a sequence position of the register stage within which a particular relay belongs. Such sequence positions number consecutively beginning with a first position which is adjacent to the input contact 12. Each relay has a contact pile-up with *a*, *b*, and *c* contacts. The *a* and *b* contacts which are of a make type of contact are used for controlling the shift register. All *c* contacts are available for useful output information and are associated with external circuits, such as the switching network 104 in FIG. 1.

It is well known that two-state devices such as switches and relays represent either one of two binary conditions usually designated "one" and "zero." Assume for purposes of this discussion that the contact 12 is normally an open circuit and that a binary "one" is injected into the register when the contact 12 is closed for a duration commencing prior to each register cycle. Contact 12 is closed by energizing its winding with a signaling pulse from signaling circuit 112 in FIG. 1. Additionally, assume that all relay contacts are normally open and that a binary "one" is temporarily stored in a relay when the relay is operated and its contacts are closed.

Signal bus $O_A$ is connected through contact 12 to a first winding terminal 13 of relay $A_1$. Signal bus $O_A$ is additionally connected in multiple through contacts *a* of all B relays to a first winding terminal 13 of the A relay in the next following stage. Signal bus $L_A$ is connected in multiple through contacts *b* of each A relay to the first winding terminal 13 of that same A relay. Signal bus $O_B$ is connected in multiple through contacts *a* of each A relay to a first winding terminal 14 of the B relay in the same stage. Signal bus $L_B$ is connected in multiple through contacts *b* of each B relay to the first winding terminal 14 of that same B relay. A common ground bus 19 is connected to a second winding terminal 16 of all relay windings. Each of the recited connections between signal buses and stage circuitry in this embodiment can be multipled to one or more additional shift register circuits if desired. Of course multiple connections are unnecessary in an application requiring a single shift register.

As previously mentioned, information is injected into the register at the input contact 12 by holding contact 12 either open or closed before commencing each successive cycle. In illustration of circuit operation, information in the form of a binary "one" is considered as it progresses through the first register stage. When closed contact 12 concurs with the beginning of a clock cycle, a "one" is shifted into relay $A_1$ in the first stage. During that first clock cycle, the "one" is shifted from the relay $A_1$ into relay $B_1$ and then the relay $A_1$ is conditioned to receive new information. The "one" is next shifted into relay $A_2$ concurrent with an injection of new information into the relay $A_1$ during a second clock cycle. After the "one" is shifted into the relay $A_2$, the relay $B_1$ is conditioned to receive new information. The shifting of information from relay to relay and from stage to stage is repetitive in such a manner that information proceeds from the input contact 12 to the last register stage.

With a "one" present at input contact 12, the contacts close and connect signal bus $O_A$ electrically in series with the winding of the relay $A_1$ and the ground lead 19. There are two separate signals provided in this embodiment to operate and latch each relay so that dry operation can be accomplished. If one clock signal were used alone, wet operation would result. When a clock cycle commences as shown at time $t_0$ in FIG. 7A, signal $O_A$ rises to a positive value and operates relay $A_1$ thereby closing its contacts. After relay $A_1$ is operated, the signal bus $L_A$ is connected through closed contacts *b* in series with the winding of relay $A_1$ to the ground lead 19. Thereafter signal $L_A$ rises to a positive potential at time $t_1$ as shown in FIG. 7A, maintains energization of the relay $A_1$, and latches it operated. The relay $A_1$ has been operated and latched by dry operation and now temporarily stores a bit of information. While relay $A_1$ is operated, signal bus $O_B$ is connected through closed contacts *a* of relay $A_1$ in series with the winding of relay $B_1$ to ground lead 19. When signal $O_B$ rises to a positive potential at time $t_2$ as shown in FIG. 7A, relay $B_1$ operates and commences a shift of information from relay $A_1$ to relay $B_1$. After relay $B_1$ is operated and its contacts closed, signal $L_B$ is connected through previously closed contacts *b* of relay $B_1$ in series with the winding of relay $B_1$ to ground lead 19. Thereafter at time $t_3$ signal $L_B$ rises to a positive potential as shown in FIG. 7A, maintains energization of the relay $B_1$, and latches it operated. Coincident with energization by signal $L_B$ at time $t_3$, signals $L_A$ and $O_B$ fall to the reference potential. Contact 12, which has been closed since time $t_0$, is opened after the time $t_1$ when the relay $A_1$ is latched and before time $t_3$. At time $t_3$ the signal $L_A$ steps down and de-energizes the relay $A_1$. Relay $A_1$ is released while its holding contacts *b* have no source voltage across them and are therefore dry. Thus the shift of information from relay $A_1$ to relay $B_1$ is completed. The relay $B_1$ has been operated and latched by dry operation and now temporarily stores a bit of information. This bit is stored in relay $B_1$ until a second cycle commences.

A second cycle commences at time $t_4$ as shown in FIG. 7A. Signal bus $O_A$ had previously been connected through the closed contacts *a* of relay $B_1$ and the winding of relay $A_2$ to ground lead 19. The signal $O_A$ rises to the positive potential at time $t_4$ as shown in FIG. 7A and operates relay $A_2$. That operation commences a shift of information from the first stage 15 into a similar second stage including relays $A_2$ and $B_2$. After relay $A_2$ is operated, signal bus $L_A$ is connected through the closed contacts *b* of the relay $A_2$ in series with the winding of the relay $A_2$ to the ground lead 19. Thereafter signal $L_A$ rises to the positive potential at time $t_5$ during the second cycle, maintains energization of the relay $A_2$, and latches it operated. As shown in FIG. 7A, signals $L_B$ and $O_A$ fall to the reference potential at time $t_5$ coincidentally with the energization of relay $A_2$ by signal $L_A$. Relay $B_1$ is released when signal $L_B$ steps down so that it is released while its holding contacts *b* have no source voltage across them and therefore are dry. The bit of information is now temporarily stored in relay $A_2$ and the shift of information from the first stage into the second stage is completed. While information is being shifted from relay $B_1$ to relay $A_2$, it is possible to inject a new bit of information into relay $A_1$ of the first stage in the manner explained previously. During successive register cycles information is shifted from stage to stage in a chain of similar stages.

If the three requirements previously stated are not followed, the clock cycle timing sequence will produce timing problems in the registetr circuit. These problems airse because relays have finite operate and release times and because multiphase clock control creates sneak paths. Operate time is a time interval elapsing between energization of a relay and chatter-free closure of relay contacts. Release time is a time interval elapsing between de-energization of a relay and complete opening of the contacts of the relay. A sneak path is a direct series connection through closed relay contacts from one signal bus to another signal bus permitting wet contact operation and, in certain instances, false register operation.

One of the previously mentioned problems exists when there are "ones" in two consecutive stages of the registter and clock signals $O_B$ and $L_A$ are both present such as between times $t_2$ and $t_3$ in FIG. 7A. Assume for example that at time $t_2$ relays $A_1$ and $A_2$ are initially operated to represent consecutive "ones" and that relays $B_1$, $B_2$, $A_3$, and $B_3$ are in the released state. Relays $B_1$ and $B_2$ will then be operated during the interval between $t_2$ and $t_3$ when there is a signal $O_B$. When relay $B_1$ operates, a connection exists from signal bus $L_A$ through contacts *b* of relay $A_2$ and contacts *a* of relay $B_1$ to signal bus $O_A$. After relay $B_2$ operates, the winding of relay $A_3$ is connected through contacts *a* of relay $B_2$ to signal bus $O_A$, and relay $A_3$ is thereby erroneously energized during the interval of signal $O_B$ by the signal $L_A$. Signal $L_A$ is applied to relay $A_3$ from signal bus $L_A$ by means of the *b* contacts of relay $A_2$, the *a* contacts of relay $B_1$, and $O_A$ signal bus, and the *a* contacts of relay $B_2$. If signal $O_B$ persists long enough, that is, more than three times minimum operate time as hereinafter discussed in greater detail, relay $B_3$ is also erroneously energized through contacts *a* of relay $A_3$ by the signal $O_B$. Such operation of relay $B_3$ generates an additional "one" in the register. This manner of false register operation and wet contact operation is prevented in this embodiment by adhering to the three previously stated requirements concerning energizing signals and maximum and minimum relay operate times.

The previously stated requirements are that the duration of operate signals must be at least as long as the maximum relay operate time, that the interval between termination of each signal and initiation of a signal from the same clock output in a next cycle must be greater than the maximum relay release time, and that the duration of operate signals must be less than three times the minimum relay operate time. Maximum relay operate time is the interval required after simultaneous energization of all relays in a given circuit for chatter-free contact closure of the slowest operating relay. Minimum relay operate time is the interval required after simultaneous energization for closure of the fastest relay. The first stated requirement arises because it is necessary to provide sufficient time for every relay to operate completely during an operate signal rather than operate partially and fail to close a holding path through its own contacts for a holding signal. The second stated requirement is necessary to insure that each relay has sufficient time to release within a cycle period after the relay has once been operated. The third stated requirement arises because an erroneous operation of a relay is not completed as described previously until four relays operate after an operate signal is initiated.

In the preceding example, relays $B_1$, $B_2$, $A_3$, and $B_3$ must all operate within the duration of signal $O_B$ to produce an erroneous "one." Relays $B_1$ and $B_2$, operate concurrently within one relay operate time commencing with an operate signal $O_B$. Relays $A_3$ and $B_3$ are operated consecutively after relays $B_1$ and $B_2$ are fully operated. The time necessary to complete an erroneous closure of relay $B_3$ is therefore three relay operate times. This time to complete an erroneous closure is a minimum in a circuit having each of the stated relays operating at the minimum relay operate time. Erroneous operation in this manner is prevented in this embodiment by limiting the duration of each operate signal to a period less than three times the minimum relay operate time. By so limiting the time duration of operate signals the last relay of the four has insufficient time to complete closure. A hold path for this relay through its own contacts will not be closed, and the relay is released before an erroneous "one" is completely injected. A similar discussiion and result pertains to two consecutive "ones" in B relays during signal $O_A$ with signal $L_B$ present. False operation is prevented by having the duration of signal $O_A$ equal or exceed the maximum relay operate time, but less than three times the minimum relay operate time. A shift register operated within these requirements is operated with dry contacts.

A ring counter circuit is a special case of a shift register in which there is only one bit of information in the stepping circuit at a time. One contact of a B relay in a last stage of a chain of stages is connected to a lead which loops back to connect to terminal 13 of the winding of the relay $A_1$ and to contacts *b* of that relay so that information travels in an endless ring as it is shifted from stage to stage. A lead 17, as shown dotted in FIG. 3, connects contact *a* of relay $B_3$ to contact *b* and the winding of relay $A_1$. Whenever relay $B_3$ is operated, signal bus $O_A$ is connected through contacts *a* of the relay $B_3$ and the winding of relay $A_1$ to the common ground lead 19. Operation of the ring counter circuit proceeds in a manner as described above for a shift register. In a ring circuit such as shown in FIG. 3, relay $A_1$ will be energized after relay $B_3$ is operated and latched. Input contact 12 is operated only once to insert a "one" which thereafter is shifted from stage to stage by control signals. Input contact 12 is held open at all other times during operation of the ring counter. Circulation of just one "one" precludes the possibility of "ones" in two consecutive stages, as happens in a shift register. Therefore, false operation is avoided and the problem of sneak paths is reduced. Thus, there is no requirement in this embodiment for the duration of operate signals to be less than three times the minimum relay operate time. However, the duration of operate signals must be at least as long as the maximum relay operate time and the interval between termination of each signal and initiation of a signal from the same output in a next cycle must be greater than the maximum relay release time. A ring counter operating within these requirements is operated with dry contacts.

It is well known that reed relays operate and release much faster than wire spring relays. Reed relays release so fast that reed relay contacts open before a transient discharge current from the relay winding expires. Thus a discharge current is present across holding path contacts which break upon release of a relay. In cases where fast operating relays, such as reed relays, are used in stepping circuits as shown in FIG. 3, is it convenient to use a contact protection network to shunt current discharged from a de-energized winding away from contacts breaking during relay release. As shown in FIG. 3A, a series connected resistor and capacitor network 18 is shunted across each relay winding of FIG. 3 to prevent harmful current discharge through breaking contacts.

In FIG. 4, there is shown a second embodiment of the invention which is adapted to eliminate the sneak paths of the first embodiment and to simplify the clock source to two output signals. Reference characters in FIG. 4 are the same as those in FIG. 3 for corresponding circuit elements. Addition of a contact protection network as shown in FIG. 3A protects the latching contacts *b* from interrupting discharge currents. Only one register stage 15 is shown because all stages are the same.

A clock source 31, as shown in FIG. 4 having two output signals, is employed to supply shift register control and latching signals I and II on similarly designated signal buses. The waveforms of the signals I and II are illustrated in FIG. 7B where a clock cycle duration includes the time between times $t_0$ and $t_2$. In the embodiment of FIG. 4, the output signal I provides both operating energy for A relays and latching energy for B relays. The output signal II provides operating energy for B relays and latching energy for A relays. It is noted that the functions of the signals I and II accomplish the same results as the signals $O_A$, $O_B$, $L_A$, and $L_B$, of the embodiment of FIG. 3. The signals $O_A$ and $L_B$, which overlap in time, are modified in duration to concur with each other and are replaced by the one signal I. Similarly, signals $O_B$ and $L_A$ are modified and replaced by the signal II. Thus modified, the four signals employed in the first embodiment become a pair of signals that are supplied from two outputs in the embodiment of FIG. 4. The waveforms supplied are the waveforms shown in FIG. 7B.

Operation of the embodiment of FIG. 4 proceeds in a manner as described for the embodiment of FIG. 3. Diodes 41, 42, 43, 44, and 45, are included in the connections from the signal buses I and II to the relays to block sneak current paths. Each of the two clock output signals in this embodiment of FIG. 4 serves a dual purpose as described because the insertion of the diodes eliminates the need for one limitation on the timing sequence of the embodiment of FIG. 3. Because signals cannot feed back through diodes, energy from one bus is not able to sneak through a closed contact to energize another bus. Therefore, erroneous operation of relays, as described for the embodiment of FIG. 3, is eliminated regardless of the duration of operate signals, and the steering contacts *a* and *b* are protected from interrupting source current. Each embodiment of this invention can be modified to operate without tthe adverse effects of wet steering contact closures by inserting diodes or other unilaterally conducting circuit elements into each operate and hold lead. However, the use of contact protection networks is still required to protect contacts *b* from arcing effects due to collapsing magnetic fields upon the release of fast release relays.

Figure 5:
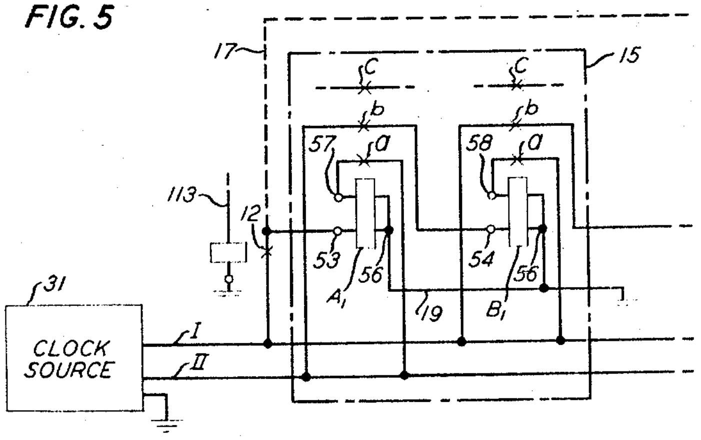
FIGS. 5 and 5A are schematic diagrams for one stage of a two-phase relay shift register using double-winding relays.

In FIG. 5, there is shown a third embodiment of the invention which is adapted to employ double-winding relays and a clock source having two output signals. Reference characters in FIG. 5 are the same as those in FIG. 4 for corresponding circuit elements. Only one register stage is shown because all stages are the same.

Figure 5A:
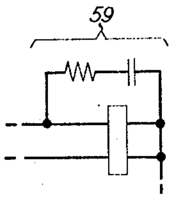

Signal bus I is connected through the contact 12 to a first terminal 53 of a first, or operate, winding of the relay $A_1$. Signal bus II is connected through contacts *a* of relay $A_1$ to a first terminal 57 of a second, or latch, winding of that relay. Signal bus II is also connected through contacts *b* of relay $A_1$ to a first terminal 54 of a first, or operate, winding of relay $B_1$. Signal bus I is also connected through contacts *a* of relay $B_1$ to a first terminal 58 of a latch winding of that relay. A second terminal 56 of each winding of each relay is connected to the common ground lead 19. Each of the two clock signals I and II in this embodiment of FIG. 5 serves a dual purpose as described for the embodiment of FIG. 4 because the use of double-winding relays eliminates paths interconnecting separate signal buses. The waveforms of FIG. 7B are used in this embodiment of FIG. 5. Signal I energizes the operate winding of A relays and the latch winding of B relays. Signal II energizes the operate winding of B relays and the latch winding of A relays. Operation of this embodiment proceeds in a manner as described for the embodiment of FIG. 3. As shown in FIG. 5A, a contact protection network 59 is provided across all latch windings in circuits employing fast release relays. This embodiment of FIG. 5 will operate with wet contacts unless unilaterally conducting circuit elements are inserted in all operate and latch leads because there are sneak paths for currents caused by induced voltage which results from magnetic coupling between the separate windings on each relay. With diodes added in all operate and latch leads, this embodiment operates with dry contacts.

Figure 6:
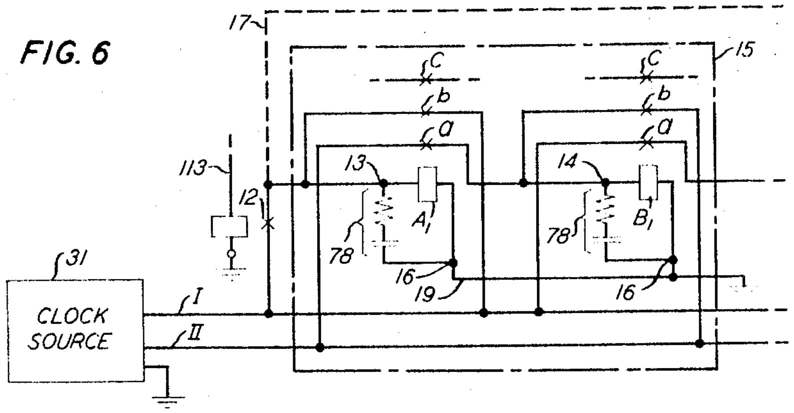
FIG. 6 is a schematic diagram of a two-phase relay shift register using single-winding relays shunted by slow release networks.

In FIG. 6, there is shown a fourth embodiment of the invention which is adapted to simplify the clock source to two output signals by employing a delay network rather than separate operate and latch signals for each relay. The delay network provides an interval in which each latched relay is held latched after its latching signal terminates before the relay is conditioned to receive new information. Reference characters in FIG. 6 are the same as those in FIG. 4 for corresponding circuit elements.

A slow release network 78, as shown in FIG. 6, shunts each relay winding. Such slow release network comprises a resistor and a capacitor connected in series. Each of the clock signals I and II in this embodiment serves a dual purpose different from those described for the embodiment of FIG. 4. In this embodiment of FIG. 6 the signal I provides energy for both operating and latching all A relays, and the signal II provides energy for both operating and latching all B relays. Therefore, the signals $O_A$ and $L_A$ from the embodiment of FIG. 3 are modified to concur in duration and are combined as signal I. Similarly, signals $O_B$ and $L_B$ are combined into signal II. The waveforms of FIG. 7B are used for this embodiment. There is a requirement for the slow release network 78 to delay the release of each latched relay for an interval after termination of its latching signal. This interval is called the delay time of the slow release network. The time constant of the slow release network is such that delay time plus minimum relay release time is equal to or greater than the maximum relay operate time. The time constant is of a magnitude similar to the maximum relay operate time which is approximately one and one-half milliseconds for a typical reed relay. There is also a requirement that the delay time plus the maximum relay release time is less than the time duration from termination of a signal to initiation of that signal in a next subsequent cycle. The slow release network 78 is additionally selected such that there is insufficient energy storage in the network 78 to operate another relay while the relay associated with the network is being held operated. These requirements provide sufficient time for a next subsequent relay to operate without causing erroneous operation and provide that each released relay will completely open its contacts prior to the next time a clock signal, which could energize that relay, is initiated. This embodiment of FIG. 6 operates with wet contacts unless unilaterally conducting circuit elements are inserted in all latch leads. With the unilaterally conducting circuit elements included, the embodiment of FIG. 6 operates with dry contacts.

It is noted that the slow release network 78 is similar in configuration to the resistor and capacitor network 18, described previously as a contact protection network. The time constant for the slow release network 78 is necessarily a large portion of a clock cycle and generally is approximately equal to or greater than one-half of a clock cycle. On the other hand, the time constant for the resistor and capacitor network 18 for contact protection is necessarily a small portion of a clock cycle and generally is approximately equal to or less than one-quarter of a clock cycle.

For use with all four of the described embodiments, the clock source 11 of FIG. 2 incorporates the diodes 130 in the signal bus leads as a means of protecting the internal circuit elements of the monostable multivibrators 126, 127, 128, and 129 from injurious transient voltages which may be present on the signal bus leads. These diodes 130 also perform other functions in certain of the described embodiments.

In the embodiments of FIGS. 4, 5, and 6, the diodes 130 assist in maintaining continuity of relay operation during possible finite time delays between the fall of signal I and the rise of signal II and vice versa. This continuity results from the charge-storage delay of the diodes 130 which provide additional release time delay to all operated relays connected to each signal bus lead.

In the fourth embodiment of FIG. 6, the diodes 130 also produce a high impedance between the signal buses and ground when the signals are off. This high impedance is required during the delay time of the slow release network 78 to prevent the high potential terminal of each operated relay coil from shorting to ground through its own closed *b* contacts and the clock. Thus there is no possibility of prematurely releasing the operated relays.

What is claimed is:

1. A relay stepping circuit comprising a plurality of nonself-latching relays arranged in a predetermined sequence, each of said relays having a single winding means and also having a first set of make contacts for supplying operating current to the winding means of the next following relay in said sequence and a second set of make contacts for supplying holding current to its own winding means, a source of plural cyclically repetitive energization signals beginning at separate times, and means connecting said winding means of each of said relays to receive from said source two different ones of said signals by different circuit paths, each of said paths including a single different set of said make contacts.

2. A circuit in accordance with claim 1 comprising a plurality of stages each including two of said relays, said connecting means including a plurality of signal buses each supplying one of said energization signals to said relays, and said energization signals include a first signal for providing operating energization to a first one of said relays in each of said stages, a second signal for providing latching energization to said first one of said relays in each of said stages, a third signal for providing operating energization to a second one of said relays in each of said stages, and a fourth signal for providing latching energization to said second one of said relays in each of said stages.

3. A circuit in accordance with claim 1 comprising a plurality of stages each comprising two of said relays, said relays each comprise one winding, said signals including a first signal for providing operating energization to a first one of said relays in each of said stages and latching energization to a second one of said relays in each of said stages, and a second signal for providing operating energization to said second one of said stages and latching energization to said first one of said relays in each of said stages, said means including a plurality of signal buses each supplying one of said signals to each of said stages, and said means including a plurality of unilaterally conducting circuit elements coupling said signal buses to said windings.

4. A circuit in accordance with claim 1 comprising a plurality of stages each including two of said relays, said relays each comprise one winding, said relays each having a minimum and a maximum relay operate time, and a minimum and a maximum relay release time, said signals including a first signal for providing operating and latching energization to a first one of said relays in each of said stages, and a second signal for providing operating and latching energization to a second one of said relays in each of said stages, said first and second signals each releasing energized ones of said relays upon termination of said signals, a slow release network shunting each said winding for withholding release of each de-energized relay for a delay time such that said delay time plus said minimum relay release time is greater than said maximum relay operate time.

5. A relay circuit comprising first and second single winding relays, a source having plural cyclically repetitive output signals beginning at separate time phases, means including a first set of make contacts coupling a first one of said signals to said winding of said first relay for operating said first relay, means including said winding of said first relay and a second set of make contacts responsive to operation of said first relay for latching said first relay, means, including a third set of make contacts responsive to operation of said first relay, coupling a second one of said signals to said winding of said second relay for operating said second relay, and means including said winding of said second relay and a fourth set of make contacts responsive to operation of said second relay for latching said second relay.

6. A circuit in accordance with claim 5 in which each of said coupling means and each of said latching means comprises a unilateral element coupling said signals to said relays.

7. A circuit in accordance with claim 5 in which said first and second relays each comprises one winding, means responsive to termination of said signals for selectively releasing latched ones of said relays, and a slow release network shunting each of said windings for delaying release of said relays after de-energization.

8. A circuit in accordance with claim 5 comprising means responsive to termination of said signals for selectively releasing latched ones of said relays, and said first and second relays each comprise a winding shunted by a contact protection network producing a transient short circuit for conducting winding discharge current when said relays are released.

9. A circuit in accordance with claim 5 comprising means responsive to termination of said signals for selectively releasing latched ones of said relays, said first and second relays comprising reed relays having plural contacts and a winding shunted by a contact protection network producing a transient short circuit for conducting winding discharge current when said relays are released thereby reducing contact erosion.

10. A relay circuit comprising first and second relays, a source having plural cyclical signals beginning at separate time phases, first unilateral means operating said first relay in response to a first one of said signals, second unilateral means, responsive to operation of said first relay and a second one of said signals, latching said first relay, third unilateral means operating said second relay in response to operation of said first relay and said second one of said signals, and fourth unilateral means, responsive to operation of said second relay and said first one of said signals, latching said second relay.

References Cited

UNITED STATES PATENTS

| | | | |
|---|---|---|---|
| 2,600,729 | 6/1952 | Boyer et al | 317—155 XR |
| 2,852,701 | 9/1958 | Leonard | 317—140 XR |
| 2,883,588 | 4/1959 | Leonard | 317—140 |
| 3,191,152 | 6/1965 | Feiner | 340—168 |
| 3,042,900 | 7/1962 | Werts. | |

OTHER REFERENCES

C. P. Clare Co. Brochure #250 OM, March 1962, "Counting, Selection, Logic With 'Clareed' Control Modules."

DONALD J. YUSKO, Primary Examiner

U.S. Cl. X.R.

317—140